(12) United States Patent
Razdan et al.

(10) Patent No.: US 8,681,664 B2
(45) Date of Patent: Mar. 25, 2014

(54) SETTING UP A FULL-DUPLEX COMMUNICATION SESSION AND TRANSITIONING BETWEEN HALF-DUPLEX AND FULL-DUPLEX DURING A COMMUNICATION SESSION WITHIN A WIRELESS COMMUNICATIONS SYSTEM

(75) Inventors: Ashu Razdan, San Diego, CA (US); Eric Rosen, Solana Beach, CA (US); David Ross, San Diego, CA (US); Beth Brewer, Canyonlake, TX (US); Arulmozhi Ananthanarayanan, San Diego, CA (US); Mohammed Ataur Rahman Shuman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 805 days.

(21) Appl. No.: 12/538,618

(22) Filed: Aug. 10, 2009

(65) Prior Publication Data

US 2010/0034123 A1 Feb. 11, 2010

Related U.S. Application Data

(60) Provisional application No. 61/188,590, filed on Aug. 11, 2008.

(51) Int. Cl.
*H04B 7/00* (2006.01)

(52) U.S. Cl.
USPC .......................................... 370/277

(58) Field of Classification Search
USPC ......... 370/276, 277, 310, 282, 293, 312, 431, 370/437, 328, 310.2, 252, 331
See application file for complete search history.

(56) References Cited

U.S. PATENT DOCUMENTS

| | | | |
|---|---|---|---|
| 7,636,327 B1 * | 12/2009 | Doran | 370/276 |
| 7,912,070 B1 * | 3/2011 | Choksi | 370/395.52 |
| 2002/0150091 A1 | 10/2002 | Lopponen et al. | |
| 2003/0224825 A1 | 12/2003 | Cox et al. | |
| 2006/0025165 A1 * | 2/2006 | Tillet et al. | 455/517 |
| 2006/0172754 A1 * | 8/2006 | Shin et al. | 455/518 |
| 2006/0189337 A1 | 8/2006 | Farrill et al. | |
| 2006/0229093 A1 | 10/2006 | Bhutiani et al. | |
| 2007/0239885 A1 | 10/2007 | Vadlakonda et al. | |

FOREIGN PATENT DOCUMENTS

| | | |
|---|---|---|
| KR | 20060088422 A | 8/2006 |
| RU | 2295841 C2 | 3/2007 |

OTHER PUBLICATIONS

International Search Report, PCT/US2009/053368, International Searching Authority, European Patent Office, Mar. 23, 2010.
Written Opinion, PCT/US2009/053368, International Searching Authority, European Patent Office, Mar. 23, 2010.

* cited by examiner

*Primary Examiner* — Anh Ngoc Nguyen
(74) *Attorney, Agent, or Firm* — Raphael Freiwirth

(57) ABSTRACT

In an embodiment, an originating device sends a request, to a server, to initiate a full-duplex session with a target device. Responsive to the full-duplex request, a half-duplex session is set-up from the originating device to the target device before the full-duplex session is set-up. The target device indicates its acceptance of the half-duplex session, receives half-duplex media from the originating device and selectively indicates its acceptance of the full-duplex session. In another embodiment, during a session currently supported either by half-duplex or full-duplex, the server arbitrating the session receives a request from one of the session participants to transition the session to another duplex-type. The server then selectively transitions the duplex-type of the session.

27 Claims, 10 Drawing Sheets

SETTING UP A FULL-DUPLEX COMMUNICATION SESSION AND TRANSITIONING BETWEEN HALF-DUPLEX AND FULL-DUPLEX DURING A COMMUNICATION SESSION WITHIN A WIRELESS COMMUNICATIONS SYSTEM

CLAIM OF PRIORITY UNDER 35 U.S.C. §119

The present Application for Patent claims priority to Provisional Application No. 61/188,590 entitled "SYSTEM AND METHOD FOR TRANSITIONING BETWEEN HALF-DUPLEX AND FULL-DUPLEX COMMUNICATION SESSIONS BETWEEN WIRELESS COMMUNICATION DEVICES" filed on Aug. 11, 2008, which is incorporated herein by reference in its entirety.

BACKGROUND OF THE INVENTION

1. Field of the Invention

Embodiments of the invention are directed to setting up a full-duplex communication session and transitioning between half-duplex and full-duplex during a communication session within a wireless communications system.

2. Description of the Related Art

Communication sessions can conventionally be initiated either as half-duplex sessions (e.g., PTT) or full-duplex sessions (e.g., VoIP). When a synchronous, full-duplex communication is desired between two telecommunication devices, such as a telephone call between two telephones, it is common to have one device attempt to start the communication and bridge the connection by contacting the other device. The telephone system then will either send a signal and/or bridge a full-duplex communication channel on a circuit switch to the other device, and the contacted device will then broadcast an alert, such as a ring or other audible alert, and can also give a visual alert, such as flashing lights or activity on a display, to inform a person near the device that another communication device is attempting to bridge a communication. A person will then answer the contacted device and the full-duplex communication will then be bridged, or if the communication was already bridged, the channel will be maintained.

In existing phone systems, the system overhead to start and then attempt to bridge the full-duplex phone call can be significant. The call-commencing process typically begins with a person signifying that they intend to make a phone call, such as by lifting up a telephone handset or pressing a button for an active line, and then the telephone system accepts the telephone number, determines the intended number, sends the appropriate alerting signal or bridges a communication channel to the other device, and waits for acceptance of the call. This process averages 10 seconds and utilizes system overhead during the entire process. There exists some functionality in the calling devices, such as speed dialing, that can hasten parts of the calling process, but this only partially reduces the calling time.

There is a wireless telecommunication service that provides a quick one-to-one or one-to-many communication half-duplex voice communication that is generically referred to as "Push-To-Talk" (PTT) capability. The specific PTT group of recipient devices for the communicating wireless device is commonly set up by the carrier, and a PTT communication connection is typically initiated by a single button-push on the wireless device that activates a half-duplex communication link between the speaker and each member device of the group, and once the button is released, the device can receive incoming PTT transmissions. In some arrangements, the PTT speaker will have the "floor" where no other group member can speak while the speaker had engaged the PTT button at his or her device. Once the speaker releases the PTT button, any other individual member of the group can engage their PTT button and they will have the floor.

A PTT communication system does not utilize a "ringing" system similar to a standard telephone system, but rather opens up a communication channel to a target wireless device upon a group member being granted the floor to talk, and the floor-holder simply starts to talk with the voice being received at and broadcasted to the target devices. Thus, in a "walkie-talkie" style, the voice from the originating wireless device is simply broadcast from the receiving wireless device, with no "answer" required at the receiving wireless device. As the original voice communication was half-duplex, for a target device to talk back to the originating wireless device (or other group members), the user of the target device presses the PTT button sends a floor-request to attempt to get the floor for the session. Thus, multiple group member devices of a PTT group do not concurrently exchange media in a half-duplex session, as in full-duplex.

SUMMARY

In an embodiment, an originating device sends a request, to a server, to initiate a full-duplex session with a target device. Responsive to the full-duplex request, a half-duplex session is set-up from the originating device to the target device before the full-duplex session is set-up. The target device indicates its acceptance of the half-duplex session, receives half-duplex media from the originating device and selectively indicates its acceptance of the full-duplex session. In another embodiment, during a session currently supported either by half-duplex or full-duplex, the server arbitrating the session receives a request from one of the session participants to transition the session to another duplex-type. The server then selectively transitions the duplex-type of the session.

DETAILED DESCRIPTION

Figure 1A:
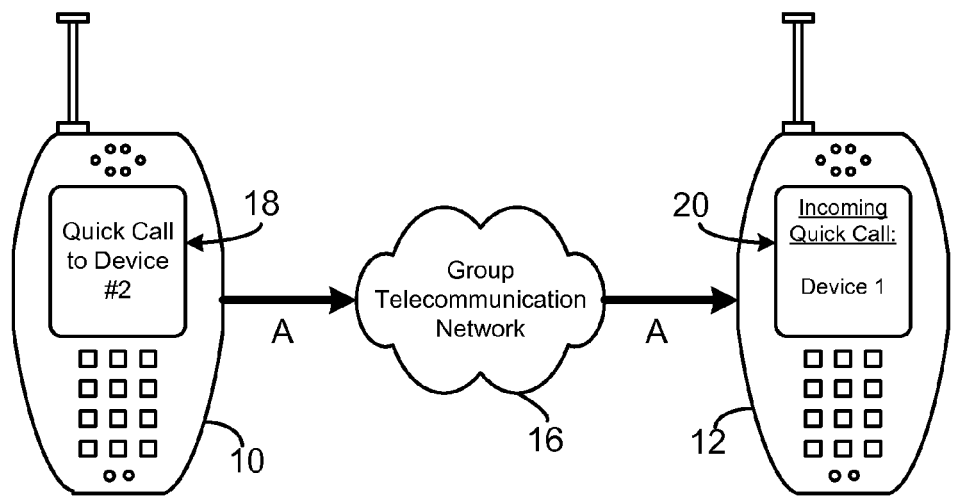
FIG. 1A is a representative diagram of a pair of communication devices, with the originating communication device opening a half-duplex communication channel to the target communication device over the group telecommunication network, intending to bridge a "quick call" thereto.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "half-duplex" means communication of data in only one direction at a time (not simultaneously or bi-directionally), thus, once a communicating device begins receiving a half-duplex signal, it must wait for the transmitter to stop transmitting, before replying, as is common in a PTT communication system. The term "full-duplex" means that communications can simultaneously occur in both directions between communicating devices, as is common in a voice telephone call. Further, like numerals refer to like elements throughout the several views, and the articles "a" and "the" includes plural references, unless otherwise specified in the description.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Figure 1B:
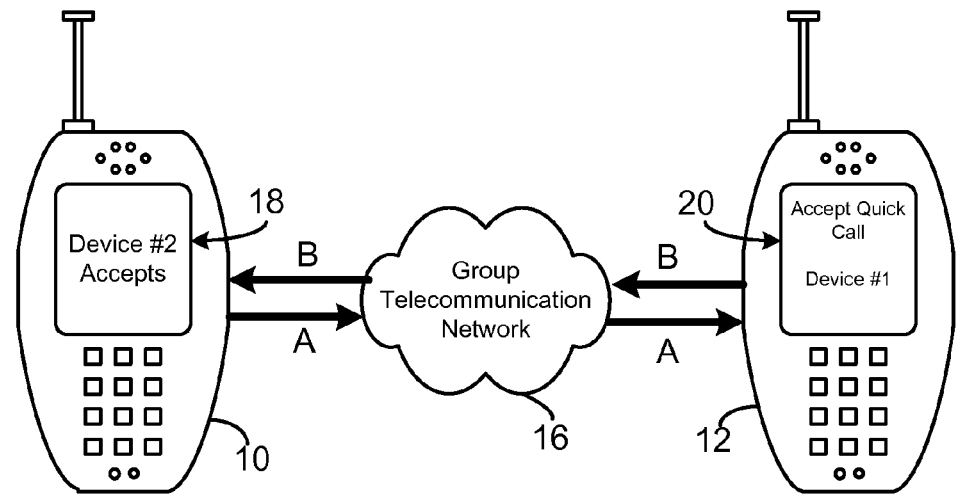
FIG. 1B is a representative diagram of the communication devices in FIG. 1A, with the target communication device accepting the "quick call" to the originating communication device over the group telecommunication network.
Figure 1C:
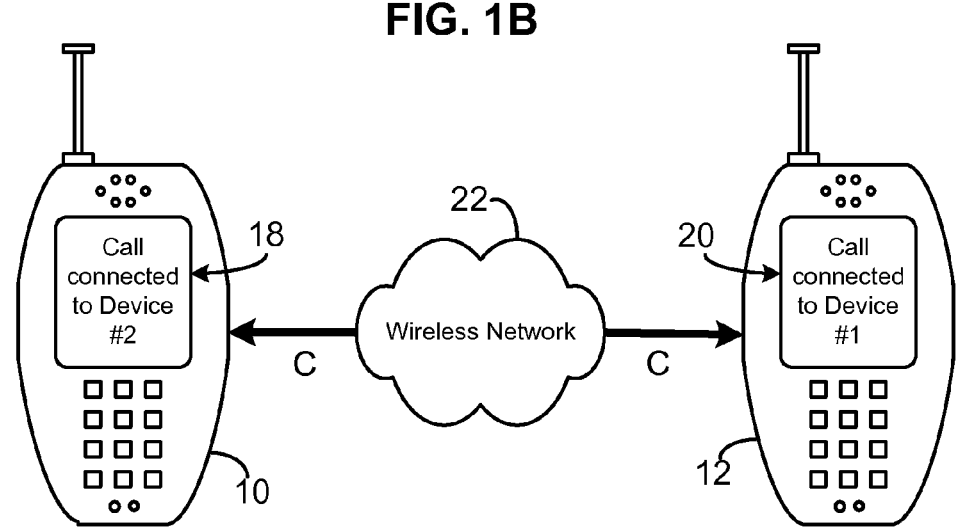
FIG. 1C is a representative diagram of the communication devices in FIGS. 1A and 1B, with a full-duplex communication bridged between the devices over a wireless network.

With reference to the figures in which like numerals represent like elements throughout, FIGS. 1A-1C illustrate and overview of the use of a half-duplex communication between communication devices 10 and 12, shown here as mobile telephones, as the initial contact attempt prior to the bridging of a full-duplex communication therebetween. In other words, an embodiment of the invention is directed to establishing a temporary half-duplex session from the originator to one or more target devices during setup or initiation of a server-arbitrated communication session that may eventually transition to a full-duplex session. FIGS. 1A-1C illustrate a broad overview of this concept, which is described in more detail below with respect to other embodiments of the invention.

FIG. 1A is a representative diagram of the pair of communication devices 10 and 12, with the originating communication device 12 opening a half-duplex communication channel A to the target communication device 12 over a group telecommunication network 16, such as a mobile network that hosts PTT half-duplex communication between wireless device member. Here, the originating device 10 (or Device #1 in this scenario) intends to bridge a "quick call" to the target communication device 12 (or Device #2) as reflected on the display 18 on device 10, and the incoming quick call request is reflected on the display 20 of device 12, informing the user of device 12 that a quick call request is coming from Device 1. As used herein, a "quick call" corresponds to any delay-sensitive server-arbitrated communication session (e.g., a half-duplex session, a full-duplex session, a PTT session, a VoIP session, etc.). The information shown on display 20 regarding the quick call request can be provided from the group communication server (74 in FIG. 2) or alternately can come from the originating device 10.

Also, in one embodiment, voice can be sent from the originating device 10 along the half-duplex PTT communication channel to audibly send information to the user at the target device 12 at the quick call request. The "alert" for the quick call request can be similar to a typical telephone "ring" but can be an audible or physical (e.g. vibration) alert and can last for a predetermined duration, such as 5 seconds, in order to give the user of the target device 12 a reasonable time to determine if he/she desires to complete the quick call. Thus, if the alert from the initial PTT call is an audible ringer being sent from the originating wireless communication device 10, the target device 12 can simply hit the "answer" button as would be done with a regular phone call, and the use of the PTT communication to setup the phone call could be completely transparent to the users of the devices 10 and 12.

FIG. 1B demonstrates the target communication device 12 accepting the quick call as illustrated on display 20. Referring to FIG. 1B, the target communication device 12 sends an acceptance B to a group communications server 74 within the group telecommunication network 16, which then forwards an indication of the target device's 12 acceptance to the originating communication device 10. Thus, the half-duplex communication channel A is maintained from the originating device 10 for the initial contact with the target device 12, while the acceptance of the quick-call is processed and full-duplex communication channel C is established between the target device 12 and the originating device 10.

Figure 2:
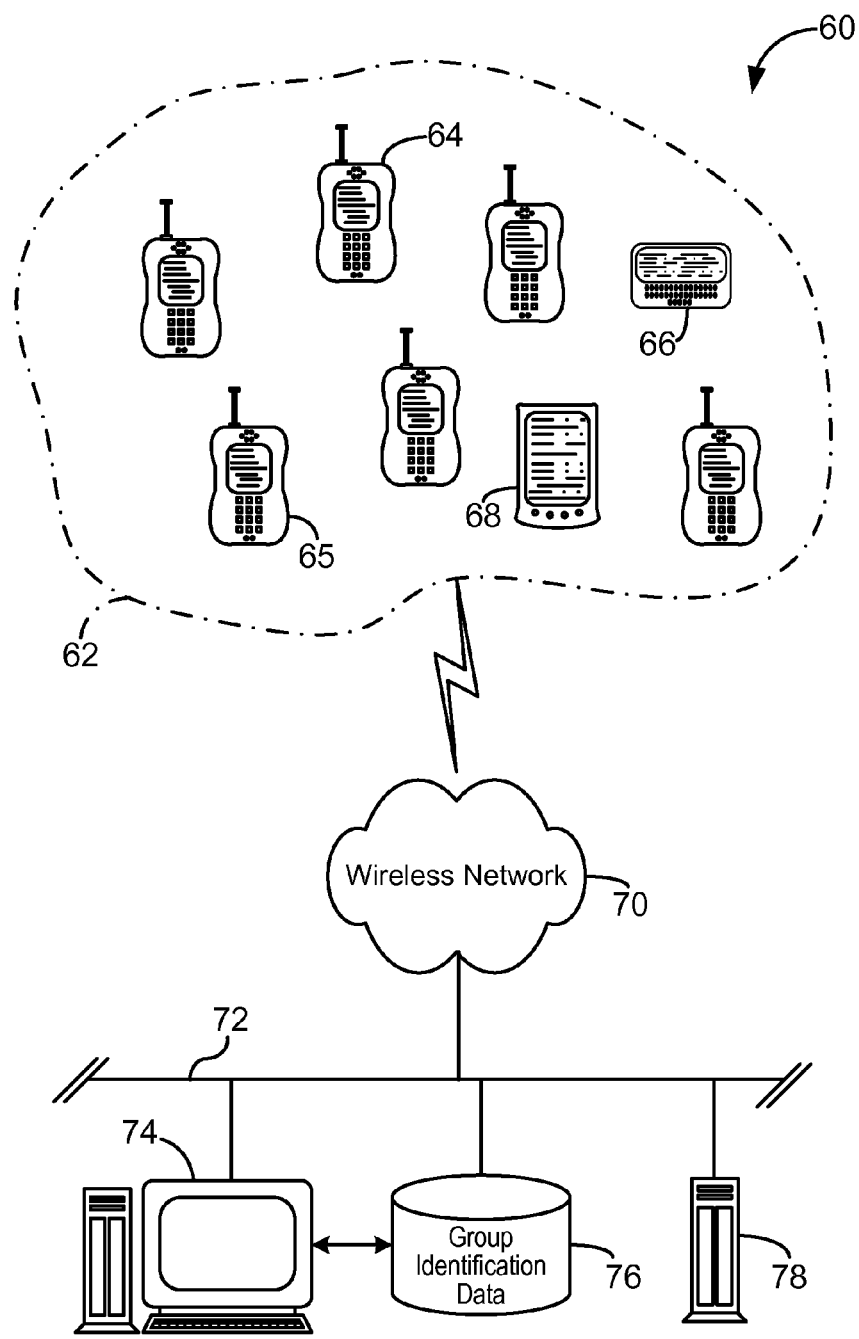
FIG. 2 is a representative diagram of a wireless network with a designated PTT group of wireless telecommunication devices communicating with a group communication server and other computer devices across the wireless network.
Figure 3:
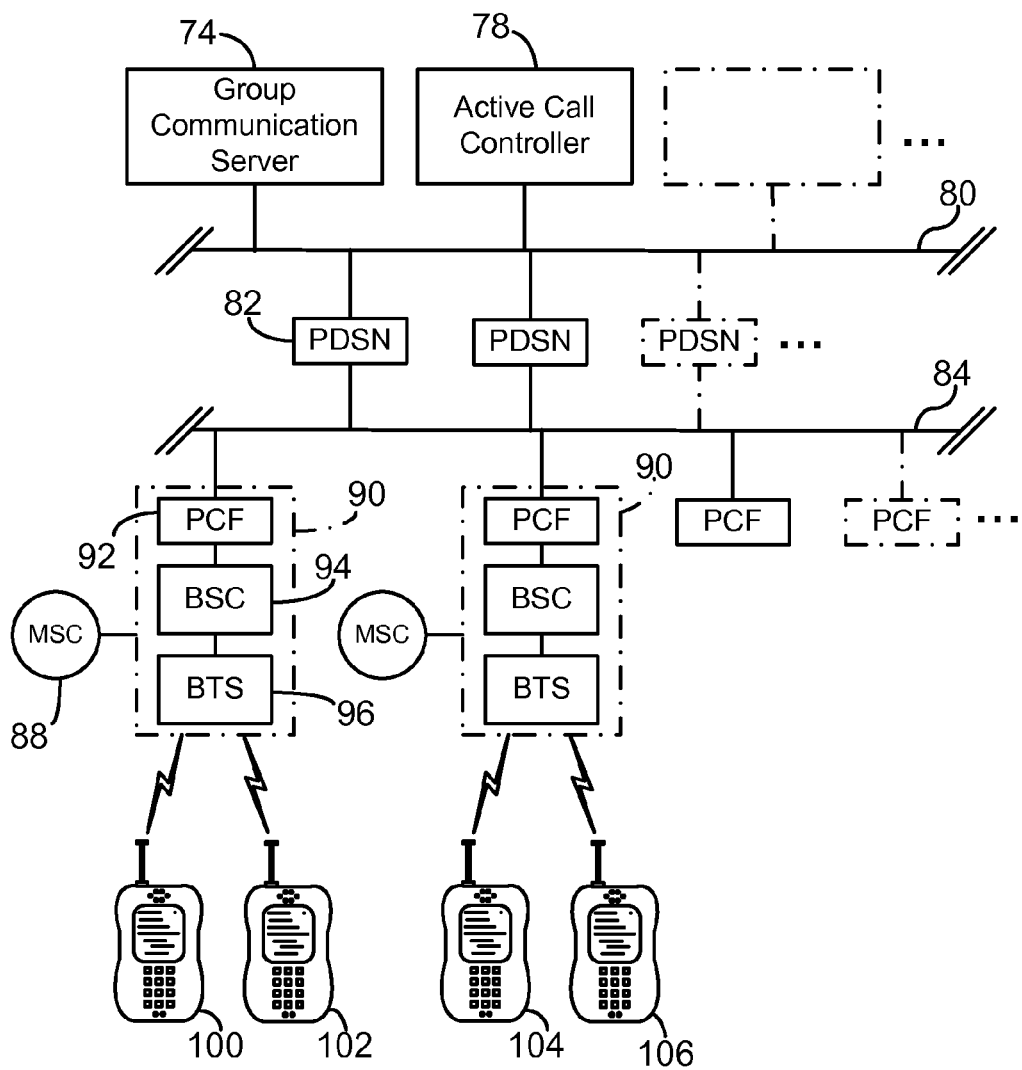
FIG. 3 is a representative diagram of one embodiment of a wireless network in a common cellular telecommunication configuration, having a group communication server control communications between the wireless telecommunication devices of PTT group members, and an active call controller that can selectively handle full-duplex communication between communication devices, once established by the group communication server.

In this embodiment, once the acceptance of the quick call is received, a full-duplex channel C is established between the communication device 10 and 12, as shown in FIG. 1C. The full-duplex communication C is bridged between the communication devices 10 and 12 over a wireless network 22, which may be the group telecommunication network 16 or any other full or partially wireless network. As more fully described below, the originating device 10 and the target device 12 can have IP addresses and thus, the control of the full-duplex communication channel can be relinquished by the group communication server 74 and maintained as VoIP packet traffic between the respective assigned addresses of the communication devices 10 and 12. Alternatively, as shown in FIGS. 2 and 3, another device, such as active call controller 78, can be used to handle the established full-duplex communications to lessen overhead on the group communication server 74 to maintain the full-duplex channels. However, the group communication server 74 and group communication network 16 can maintain and/or control the full-duplex communication completely.

In an example, as will be described in more detail below, the channels C of the full-duplex communication session may correspond to the call originator maintaining its half-duplex channel A and having the initial call target(s) obtain their own channel. In this manner, the call originator's half-duplex channel need not be torn down and brought up again during the transition from half-duplex to full-duplex.

FIG. 2 illustrates one embodiment of the system 60 with a group communication server 74 configured to arbitrate communication sessions between one or more wireless telecommunication devices in a PTT group 62, such as the wireless telephone 64, smart pager 66 and/or personal digital assistant (PDA) 68, with other wireless telecommunication devices across a wireless network 70. In the system 60, each wireless telecommunication device 64,66,68 is capable of selectively and directly communicating across the wireless communication network 70 with a target set of one or more other wireless telecommunication devices through a half-duplex communication and/or a full-duplex communication. For example, the target set for mobile telephone 64 can be all devices in the communication group 62 or a subset thereof, such as pager 66 and PDA 68. Other communication devices can be alternatively used in the present system that can have other wired network connections, so long as such devices are enabled to engage in PTT half-duplex communications, or full-duplex communications if so embodied, through the group communication server 74.

In an embodiment, a group communication computer device, shown here as group communication server 74, which is present on a server-side LAN 72 across the wireless network 70, is configured to indicate that the wireless device is present, i.e. accessible, on the wireless network 70. The group communication server 74 can share this information with the set of target wireless telecommunication devices designated by the first wireless telecommunication device, or can also share this information with other computer devices resident on the server-side LAN 72 or accessible across the wireless network 70. The group communication server 74 can have an attached or accessible database 76 to store the group identification data for the wireless devices. Thus, the group communication server 74 handles the arbitration of group communication sessions within the network. Further, the group communication server 74 can be representative of multiple group communication servers 74 within the network, with each group communication server 74 arbitrating sessions in different regions of the network. It should be appreciated that the number of computer components resident on server-side LAN 72, or across the wireless network 70, or Internet generally, are not limited.

In an example, a direct communication, such as a PTT communication, can be established through a half-duplex channel between the communicating wireless telecommunication device 64, 66, 68 and one or more other wireless telecommunication devices of the target set. The group communication computer device 74 can also inform the wireless telecommunication device 64, 66, 68 of the inability to bridge a direct communication to the target set 62 upon none of the wireless telecommunication devices (or at least one) of the target set not having informed the group communication computer device 74 of their presence on the wireless network 70. Further, while the group communication computer device 32 is shown here as having the attached database 76 of group identification data, the group communication computer device 74 can have group identity data resident thereupon, and perform all storage functions described herein.

Thus, in an embodiment, an attempt to ultimately bridge a full-duplex synchronous communication is accomplished by initially sending a half-duplex push-to-talk communication request from an originating member of a PTT group 62, to another target communication device, such as mobile phone 65. The target communication device 65 will then receive the PTT communication with the quick call data from the originating communication device (or not if the target communication devices are embodied so as to control such functionality) and determine whether or not to "answer" the quick call, as shown in FIGS. 1A-1C. In this embodiment, the bridge attempt is the receipt of the half-duplex communication at the target communication device(s), as opposed to the bridging of a full duplex voice channel to the originating device as in making a traditional phone call. However, the voice or other data (e.g., an announce message configured to announce the communication session) carried in the half-duplex transmission from the originating communication device does require immediate delivery, so such communication bridge attempt is still an attempt at a synchronous communication.

Also in the embodiment in FIG. 2, there is shown an active call controller 78 that can be used to host and/or control the full-duplex communication channels after a transition from the half-duplex communication mediated by the group communication server 74. This embodiment thus provides the group communication server 74 the ability to handoff the full-duplex communication channels once established to lessen the overhead of the server 74.

Although a group communication is typically half-duplex voice data among members of the communication group 62, the group communication can be voice, applications, graphic media, such as pictures in JPEG, TIF, and the like, or audio files such as MP3, MP4, WAV, and the like. The media can also be streaming media, such as a multimedia application (PowerPoint, MOV file, and the like).

Thus, in overview, there is provided a system 60 for bridging a full-duplex communication channel between two wireless communication devices, such as communication devices 10 and 12 in FIGS. 1A-1C, across a wireless communication network 70. Originating communication device 10 is configured to bridge one or more full-duplex communication channels with one or more communication devices 64,66,68 across a wireless communication network 70, and the origination communication device 10 is further configured to selectively send a half-duplex communication to one or more communication devices 64,66,68, such as a PTT communication. At least one wireless communication device 64,66,68 is likewise configured to bridge one or more full-duplex communication channels with one or more communication devices 64,66,68 at least partially across the wireless communication network 70, and that wireless communication device is further configured to selectively receive a half-duplex communication from one or more communication devices 64,66,68. A group communication server 74 controls group communications between the plurality of wireless communication devices 62 on the wireless communication network 70 wherein the group communications are initially comprised of a half-duplex communication from an originating wireless communication device (mobile phone 10) directed to other member wireless communication devices of the communication group. Upon a wireless communication device 10 sending a half-duplex communication to a target wireless communication device 12 through the group communication server 74, the target wireless communication device 12 then accepts and sends an acceptance to the originating wireless communication device 10 through the group communication server 74, the group communication server 74 then bridging a full-duplex communication between the originating wireless communication device 10 and the target wireless communication device 12.

In one embodiment, the half-duplex communication and ultimate establishment of a full duplex communication occur from the exchange of voice-over-Internet-Protocol (VoIP) data packets between the communicating devices. Consequently, the group communication server 74 can be further configured to obtain the assigned network addresses (typically assigned by a PDSN 82) to the originating wireless communication device 10 and target wireless communication device 12 to relinquish control of the full-duplex communication once established. In the case of full-duplex, it will be appreciated that the group communication server 74 still receives media from group members and forwards the media to other group members, but the group communication server 74 is not responsible for floor arbitration when operating in full-duplex. As shown in FIGS. 2 and 3, the group communication server 74 can further be configured to relinquish control of the full-duplex communication to another computer device, such as active call controller 78 or other media controller.

In one embodiment, the originating wireless communication device 10 can be further configured to selectively force the target wireless communication device 12 to accept the full-duplex or half-duplex communication and cause the communication to be established. For example, a mobile device that is intended to be used by a child can be configured to allow the parent to cause the mobile device to open up the full-duplex or half-duplex communication to the originating device such that the parent can force the child's phone to answer. The parent can use this feature to monitor the activity of the child, for example, this feature can also be used in child abduction cases in which the child retains his/her mobile device.

FIG. 3 is a representative diagram of one embodiment of a wireless network in a common cellular telecommunication configuration, having a series of group communication computer devices (group communication servers) 74 that control communications between the wireless communication devices of set group members (devices 100,102,104,106) in a PTT system. The wireless network is merely exemplary and can include any system whereby remote modules communicate over-the-air between and among each other and/or between and among components of a wireless network 70, including, without limitation, wireless network carriers and/or servers. A series of group communication servers 74 are connected to a group communication server LAN 50. Wireless telephones can request packet data sessions from the group communication server(s) 74 using a data service option. Also, shown on the server LAN 80 is the active call controller 78 similar to that as described in FIG. 2.

The group communication server(s) 74 are connected to a wireless service provider's packet data service node (PDSN), such as PDSN 82, shown here resident on a carrier network 84. Each PDSN 82 can interface with a base station controller 94 of a base station 90 through a packet control function (PCF) 92. The PDSN 82 will typically assign network addresses to wireless communication devices, such as IP network addresses for VoIP communications. The PCF 82 is typically located in the base station 90. The carrier network 84 controls messages (generally in the form of data packets) sent to a mobile switching center ("MSC") 88. The carrier network 84 communicates with the MSC 88 by a network, the Internet and/or POTS ("plain ordinary telephone system"). Typically, the network or Internet connection between the carrier network 84 and the MSC 88 transfers data, and the POTS transfers voice information. The MSC 88 can be connected to one or more base stations 90. In a similar manner to the carrier network, the MSC 88 is typically connected to the base transceiver station (sometimes referred to as "branch-to-source") (BTS) 96 by both the network and/or Internet for data transfer and POTS for voice information. The BTS 96 ultimately broadcasts and receives messages wirelessly to and from the wireless devices, such as cellular telephones 100,102,104,106, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 100, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 100, can download many types of applications, such as web pages, applets, MIDlets, games and data. In wireless devices that have designated a communication group 62 (FIG. 2), the wireless communication device can directly connect with the other member of the set and engage in voice and data communication sessions. However, all such communication sessions may be 'server-arbitrated', which means that the communication sessions will occur through, or be at the control of, the group communication server 74. Each data packet of the devices need not necessarily have to travel through the group communication server 74 itself, but the group communication server 74 must be able to ultimately control the communication session because it will typically be the only server-side 80 component that is aware of and/or can retrieve the identity of the members of the communication group, or direct the identity of the members of the communication group 62 to another computer device.

Figure 4:
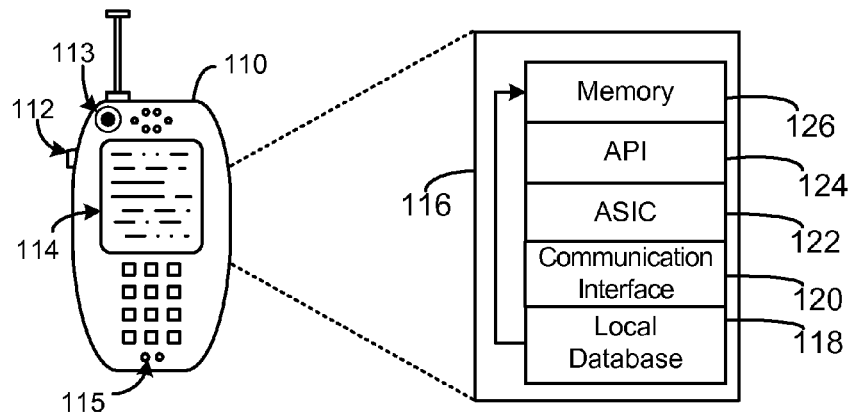
FIG. 4 is a block diagram illustrating the computer platform of the wireless telecommunication device, here shown as embodied with PTT capability.

FIG. 4 is a block diagram illustrating one embodiment of the communication device (originating or target) being a mobile telephone 110 with a PTT button 112 that opens the direct communication to a target set of devices, i.e. other members of the communication group 62. The wireless device 110 is also shown as having a graphics display 114 to the user of the wireless device 110, and a microphone 115 that can be used to capture audio proximate to the device 110. The wireless device 110 also includes a camera 113 that can capture visual data that is proximate to the device.

The wireless device 110 includes a computer platform 116 that can handle voice and data packets, and receive and execute software applications transmitted across the wireless network 70 to include the group communications. The computer platform 116 includes, among other components, an application-specific integrated circuit ("ASIC") 122, or other processor, microprocessor, logic circuit, programmable gate array, or other data processing device. The ASIC 122 is installed at the time of manufacture of the wireless device and is not normally upgradeable. The ASIC 122 or other processor executes an application programming interface ("API") layer 124, which includes the resident application environment, and can include the operating system loaded on the ASIC 122. Resident programs can be held in the memory 126 of the wireless device. An example of a resident application environment is the "binary runtime environment for wireless" (BREW) software developed by QUALCOMM® for wireless device platforms.

As shown here, while the wireless device can be a mobile telephone 110, with a graphics display 114, in alternative embodiments the wireless device can correspond to any type of wireless device with a computer platform 116 as known in the art, such as a personal digital assistant (PDA), a pager with a graphics display 114, or even a separate computer platform 116 that has a wireless communication portal, and may otherwise have a wired connection to a network or the Internet. Further, the memory 116 can include read-only or random-access memory (RAM and ROM), EPROM, EEPROM, flash cards, or any memory common to computer platforms. The computer platform 116 can also include a local database 118 for storage of software applications not actively used in memory 126. The local database 118 is typically comprised of one or more flash memory cells, but can be any secondary or tertiary storage device as known in the art, such as magnetic media, EPROM, EEPROM, optical media, tape, or soft or hard disk.

In this embodiment of the wireless device, the computer platform 116 of FIG. 4 also includes a communication interface 120 that can open communication channels from the wireless device (e.g., for voice calls, full-duplex calls, half-duplex calls, PTT sessions, VoIP sessions, etc.). The communication interface 120 can also be part of the standard communication interface for the wireless device which ordinarily carries the voice and data transmitted to and from the wireless device. The communication interface 120 typically includes hardware as is known in the art.

In an example, when embodied as the target wireless communication device 12 including a microphone 115 for recording sound and the target wireless communication device 12 able to be forced to respond to the request for a quick call and open up the full-duplex communication, the originating wireless communication device 10 can further be configured to selectively activate the microphone 115 at the target communication device 12 upon the forcing of the full-duplex communication. The target communication device 12 can accordingly be further configured to selectively allow the forcing of the establishment of the full-duplex channel, and selectively allow the activation of the microphone 115, such as through a predetermined setting on the device.

Figure 5:
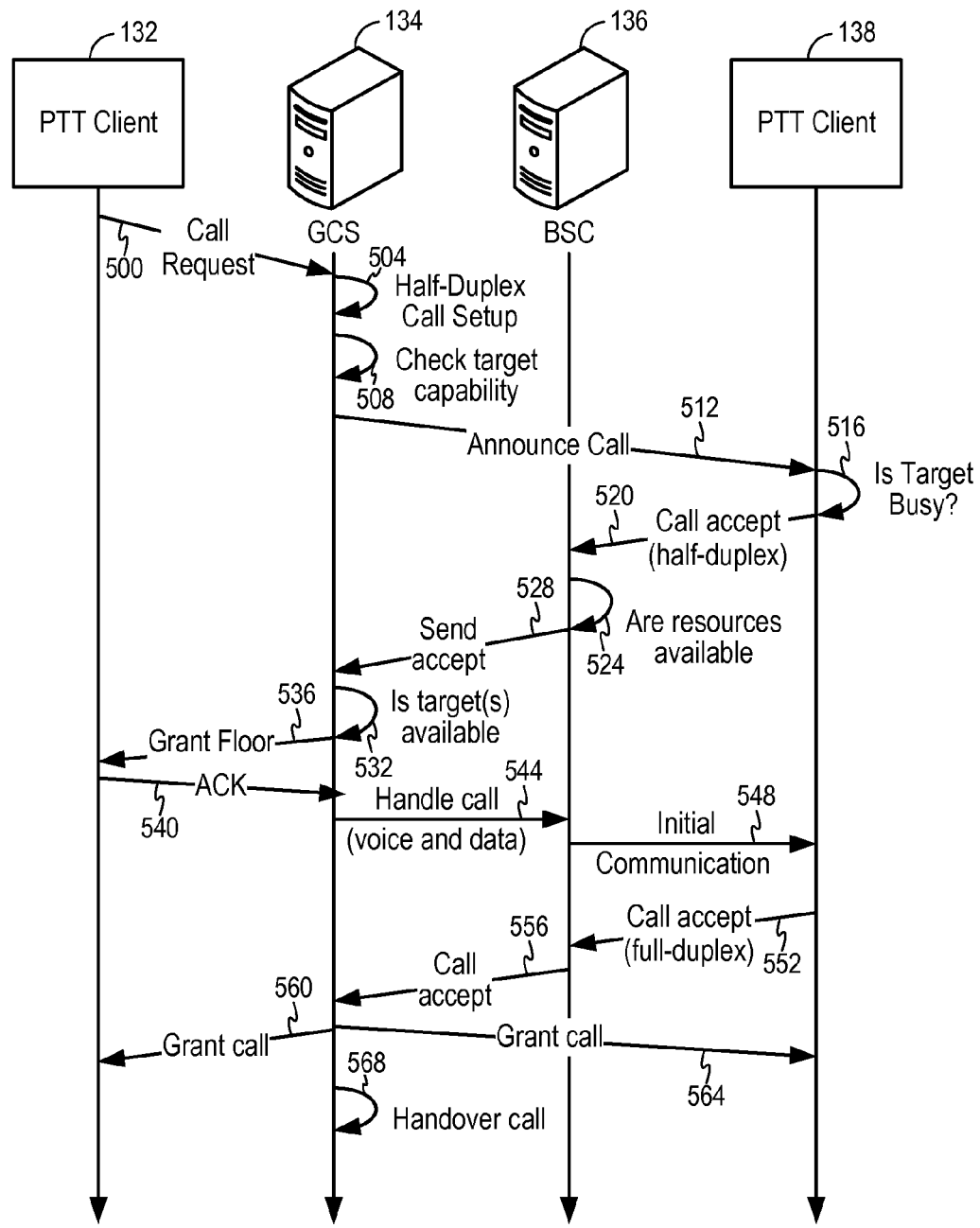
FIG. 5 is a call flow diagram of a process of setting up a full-duplex communication session by first establishing a half-duplex communication session in accordance with an embodiment of the invention.

FIG. 5 is a call flow diagram of a process of setting up a full-duplex communication session by first establishing a half-duplex communication session in accordance with an embodiment of the invention. Referring to FIG. 5, a session originator (e.g., PTT client 132) sends a call request to the group communication server (GCS) 134 to request initiation of a full-duplex PTT communication session with at least one session target (e.g., PTT Client 138), 500. In an example, the call request of 500 can contain the target user address(es), a Group application ID, a request to establish a group, etc. In a further example, the call request may also be sent with a DataOverSignaling (DoS) Access channel message. The call request message is further configured to indicate, to the GCS 134, the session originator's intent to set-up the session as half-duplex at first, with the understanding that the session can later transition to full-duplex once the call target accepts the full-duplex transition (e.g., by answering the call). As will be appreciated, the session originator can send messages on a reverse link access channel without having to establish a dedicated traffic channel on which to transmit, such that the DoS access channel message can potentially be sent to the GCS 134 more quickly as compared to a call message that is sent over a TCH. The GCS 134 (e.g., a Dispatch Call Handler (DCH)) performs the PTT call setup functions, 504, including locating the target, applying call restrictions, and selecting a vocoder. The GCS 134 also checks whether the target is capable of participating in the communication session, 508. The GCS 134 then sends an announce message, through the session target's serving BSC 136, that announces the full-duplex communication session, 512. As will be appreciated, the announce message is configured to announce a 'potential' full-duplex session in the sense that the session will initially be half-duplex and will transition to full-duplex once the call target accepts the transition. In an embodiment, the announce message sent in 512 can be configured to force acceptance of the session, such that the target accepts the call without intervention. Alternatively, the announce message need not be configured in this manner.

The session target (e.g., PTT Client 138) receives the incoming call announce message in 512, and then determines whether the session target is busy such that the call cannot be accepted, 516. For example, if the session target is already engaged in another communication session, the session target may reject the announced session. Otherwise, if the session target determines that it is not busy, the session target sends a call accept message on a reverse link channel (e.g., a reverse link access channel) to the BSC 136 to be forwarded to the GCS 134,520. In an example, the call acceptance of 516 and 520 can be 'automatic' or forced in the sense that a user of the PTT client 138 need not be given an opportunity to reject the session. Alternatively, the user of the PTT client 138 can voluntarily elect to accept the session. Assuming that the BSC 136 determines that sufficient resources are available for supporting the communication session, 524, the BSC 136 forwards the call accept message to the GCS 134, 528. Upon receiving a call accept message from a first responder to the announce message, 528, 532, the GCS 134 sends a floor-grant message to the session originator, 536, and the session originator acknowledges receipt of the floor-grant message, 540.

At this point, along with the floor-grant ACK message, the session originator begins forwarding media to be sent to the at least one session target in a half-duplex manner. In other words, the session target does not necessarily yet have a traffic channel (TCH) on which to transmit media back to the session originator in a full-duplex manner. Thus, at this point, once the session originator has the floor, the communication session at this point is half-duplex even though the session requested for initiation at 500 was a full-duplex session. Accordingly, a temporary half-duplex session is established to facilitate the forwarding of initial media from the session originator to the session target before the full-duplex session is established.

Accordingly, the GCS 134 receives the media (e.g., voice and/or other data) from the session originator and forwards the media to the BSC 136, 544, for transmission to the session target, 548. While participating in the half-duplex session that is initially set up between the session originator and session target, the session target either (i) automatically 'answers' the call to obtain call resources for full-duplex participation, or alternatively (ii) prompts a user of the session target to request whether the user wishes to participate in the session as a listener-only or as an active participant. In this example, assume that the session target determines to answer the call and partake in the session in a full-duplex manner. Accordingly, at some point, assume that the session target obtains the requisite resources to participate in the session in a full-duplex manner. In other words, if necessary, the session target can obtain a TCH on which to send media back to the session originator (e.g., although the session target may already have a TCH, in which case bringing up an additional TCH is not necessary). At this point, the session target sends another call accept message to the BSC 136, 552, which is forwarded to the GCS 134, 556. As will be appreciated, the call accept messages of 520 and 552 are both sent in response to the announce message from 512, with the first call accept message of 520 indicating the target's acceptance of the temporary half-duplex session, and the second call accept message of 552 indicating the target's acceptance and readiness to participate in the session via full-duplex. In an alternative embodiment, while not shown in FIG. 5, the announce message of 512 can represent two separate announce messages, such that a first announce message can be sent to announce the half-duplex communication session and a second announce message can be sent at a later point in time (but before 552) to announce the full-duplex communication session.

The GCS 134 then becomes aware that the half-duplex session can transition to a full-duplex session. As such, the GCS 134 sends a call-grant message to each active session participant (e.g., the session originator and session target), 560 and 564. The call-grant message includes instructions with regard to the network entity that will be handling the arbitration of the full-duplex session, which is not necessarily the GCS 134. For example, the session can be handed over to an active call controller 78 or to the PTT clients 132 and 138, 568 (such as, for example, if embodied with network address assignment for VoIP communications). In an example, the call resources allocated to the session originator for the temporary half-duplex session can be maintained and re-used during the full-duplex session, such that the originator's call resources need not be torn down and brought up again. Thus, the half-duplex session may only be terminated in the sense that a return-path is added upon conversion to full-duplex in an example.

Accordingly, FIG. 5 shows how delay-sensitive call setup procedures typically associated with half-duplex sessions can be used to set-up a full-duplex communication session more quickly, such that a temporary half-duplex session is established followed by an eventual conversion to full-duplex. In an example, the process of FIG. 5 can be implemented for full-duplex sessions that are deemed to be delay-sensitive (e.g., 'quick calls'). Alternatively, it is possible that the process of FIG. 5 can be used for setting up any full-duplex communication session.

Figure 6:
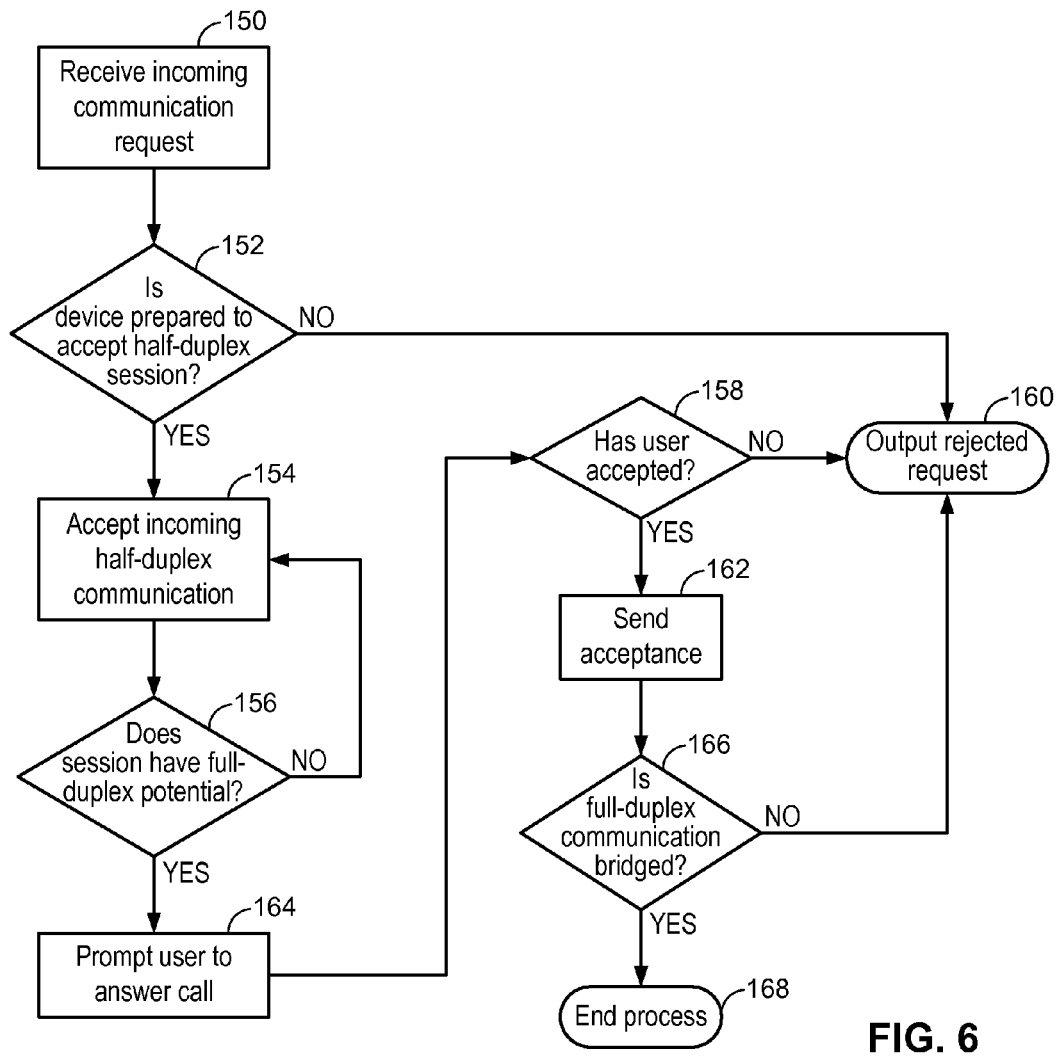
FIG. 6 illustrates the process of FIG. 5 in more detail from the perspective of a session target in accordance with an embodiment of the invention.

FIG. 6 illustrates the process of FIG. 5 in more detail from the perspective of the session target in accordance with an embodiment of the invention. Referring to FIG. 6, an announcement of a full-duplex (e.g., PTT) communication session that is temporarily initiated as a half-duplex communication session is received at the session target, 150 (e.g., such as the PTT-call announce message received at 512 of FIG. 5, which can be interpreted as an announcement for both a half-duplex session and a full-duplex session). The session target determines whether the half-duplex communication session can be accepted in 152 (e.g., as in 516 of FIG. 5). If the session target determines that the announced half-duplex communication session cannot be accepted, the session target transmits a call reject message (e.g., an announce ACK (reject) message) to the GCS 134, 160. Otherwise, if the session target determines that it is possible to accept the half-duplex communication session in 152, then the half-duplex communication session is accepted in 154 (e.g., by sending a call accept message, as in 520 of FIG. 5). In an example, the acceptance of 154 can either be automatic so long as the session target is capable of accepting the half-duplex communication session (e.g., if the incoming communication request of 150 is configured to force acceptance of the session), or alternatively can be based on a user of the session target voluntarily accepting the session.

After accepting the half-duplex communication session in 154, the session target determines whether the announced half-duplex communication session has the potential to be transitioned to a full-duplex session. In other words, announced half-duplex communication sessions are typically half-duplex in nature. Indeed, even in FIGS. 5 and 6, the session begins as half-duplex even if an eventual transition to full-duplex is made. Thus, in 156, the session target determines whether this particular half-duplex communication session has the potential for a transition to a full-duplex session (e.g., based on a header-configuration in the PTT announce message, etc.). If the session target determines that the half-duplex communication session is a 'typical' half-duplex session (e.g., the goal of the session is to be half-duplex and not to later transition to full-duplex) in 156, the process returns to 154 and the session target participates in the session via half-duplex protocols, as is known in the art.

Alternatively, if the session target determines that the communication session is initially a half-duplex session but has the further potential of being transitioned to a full-duplex session in 156, then the session target prompts a user thereof with regard to whether the user wishes to 'answer' the call, 164. In other words, to answer the call in this case means to participate in the communication session as another speaker, which means to transition the session to full-duplex. In an alternative example, the prompting of 164 can be skipped and the session target can be forced to transition the session to full-duplex (e.g., if the incoming communication request of 150 is configured to force acceptance of the session). The session target determines whether the user has accepted the prompt, 158. If not, the session target either transmits a call reject message to the GCS 134, 160. In this case, the call reject message can be configured either (i) to reject the full-duplex nature of the call while permitting the session target to continue to participate in the PTT session in a half-duplex nature as a listener, or (ii) to reject the session entirely and drop the session altogether. Alternatively, instead of transmitting a call reject message, the session target can simply refrain from sending a second call accept message at 162, where the GCS 134 will interpret the lack of a second call accept message as a rejection of the full-duplex transition. In another embodiment, the second call accept (full duplex) is made optional and the originator can consider reception of media from the target as an implicit acknowledgment that the target has accepted full duplex mode.

Otherwise, if the session target determines to answer the call (e.g., either automatically or upon request by a user thereof) and participate in the full-duplex session, the session target sends a call accept message to the GCS 134 that indicates that the temporary half-duplex session can now transition to a full-duplex session (e.g., as in 552 of FIG. 5). The call accept message of 154 (or 520 of FIG. 5) and 162 (or 552 of FIG. 5) can be configured in the same manner, in an example, with the GCS 134 interpreting a first received call accept message as an acceptance of the half-duplex portion of the session, and a second received call accept message as an acceptance of the full-duplex transition for the session. While not shown in FIG. 6, during this period before the full-duplex transition is made, the session target can monitor a downlink channel and receive media from the session originator in a half-duplex manner. In 166, the session target determines the requested full-duplex session has been set up within a threshold period of time. If not, the session target transmits a call reject message to the GCS 134, 160. Otherwise, the full-duplex session is established and the set-up process of FIG. 6 terminates.

Figure 7:
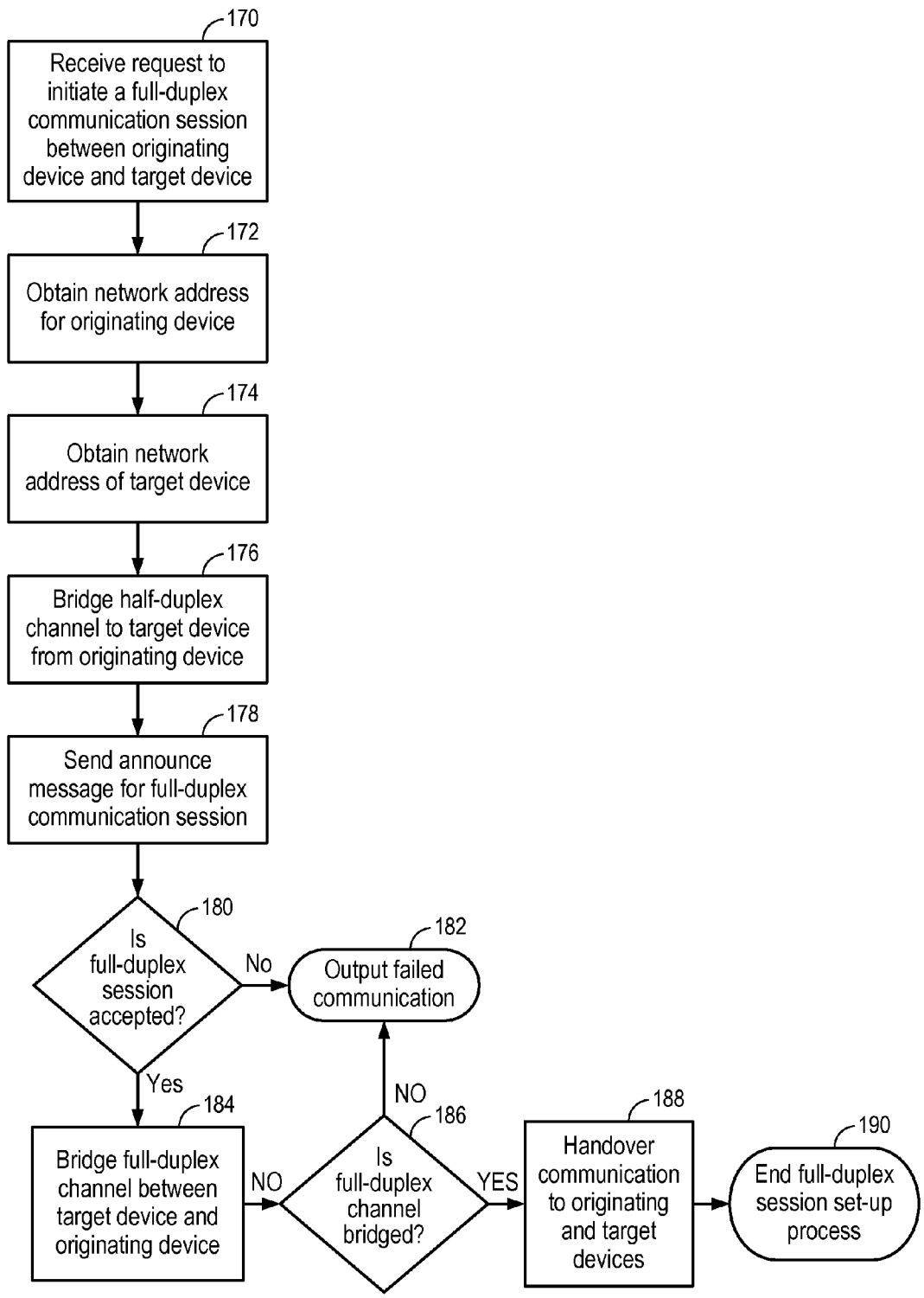
FIG. 7 illustrates the process of FIG. 5 in more detail from the perspective of a group communications server in accordance with an embodiment of the invention.

FIG. 7 illustrates the process of FIG. 5 in more detail from the perspective of the group communications server 134 in accordance with an embodiment of the invention. Referring to FIG. 7, the group communication server 74 or 134 receives a request (e.g., a specially configured CALL message) to initiate a full-duplex communication session by first setting-up a half-duplex communication channel from the originating communication device 10, 170. The group communication server 74 or 134 then obtains a network address, such as an IPv6 address, for the originating communication device 10, 172, and likewise obtains the network address of the target device 12, 174, such that the group communication server 74 or 134 can direct communications between the originating and target devices 10 and 12 (e.g., with VoIP packets). The group communication server 134 then sets up or bridges a half-duplex channel from the originating communication device 10 to the target communication device 12, 176 (e.g., by having an access network allocate a reverse-link channel upon which the originating device 10 can transmit data while also allocating a downlink channel upon which the target device 12 can receive data). In addition to setting up the half-duplex channel from the originating device 10 to the target device 12, the group communication server 134 sends an announce message for announcing the full-duplex communication session to the target communication device 12, 178. Thus, by first setting up the half-duplex channel, media from the originating device 10 can be sent to the target device 12 more quickly, and the target device 12 can attempt to transition to a full-duplex session in parallel with receiving media from the originating device 10 via the half-duplex channel.

After sending the announce message to the target device 12 in 178, the group communication server 134 determines whether the target device 12 has accepted the full-duplex communication session, 180. For example, the determination of 180 can be that the target device 12 has accepted the full-duplex communication session if the target device 12 sends a call acceptance message in 162 of FIG. 6. If the full-duplex communication session is not accepted by the target device 12 at decision 180, then the failure indication is output (e.g., to the originating device 10) and the process is terminated. Otherwise, if the full-duplex communication session is accepted at decision 180, then a full-duplex communication channel is bridged between the originating communication device 10 and the target communication device 12, 184. A determination is then made as to whether the full-duplex communication channel has successfully been bridged, 186. If the full-duplex communications channels is determined not to have been successfully bridged at decision 186, then a failed communication is output to the originating device 10, 182. Otherwise, if the full-duplex communication is determined to have been successfully bridged at decision 186, then the bridged full-duplex communication is handed over to the originating wireless communication device 10 and target communication device 12, 188. For example, the handover of the full-duplex communication in 188 may mean that VoIP packets are exchanged between the network addresses of the communication devices without further arbitration by the group communication server 134, such that the set-up of the full duplex communication session terminates, 190. For example, if the full-duplex session is a VoIP session, the exchange of media during the VoIP session can be handled by a different network entity in at least one embodiment.

While FIGS. 5 through 7 have been described whereby a full-duplex communication session is set-up as an initial half-duplex session that later transitions to full-duplex, other embodiments are directed to transitions from full-duplex sessions to half-duplex sessions and/or from half-duplex sessions to full-duplex sessions.

Figure 8:
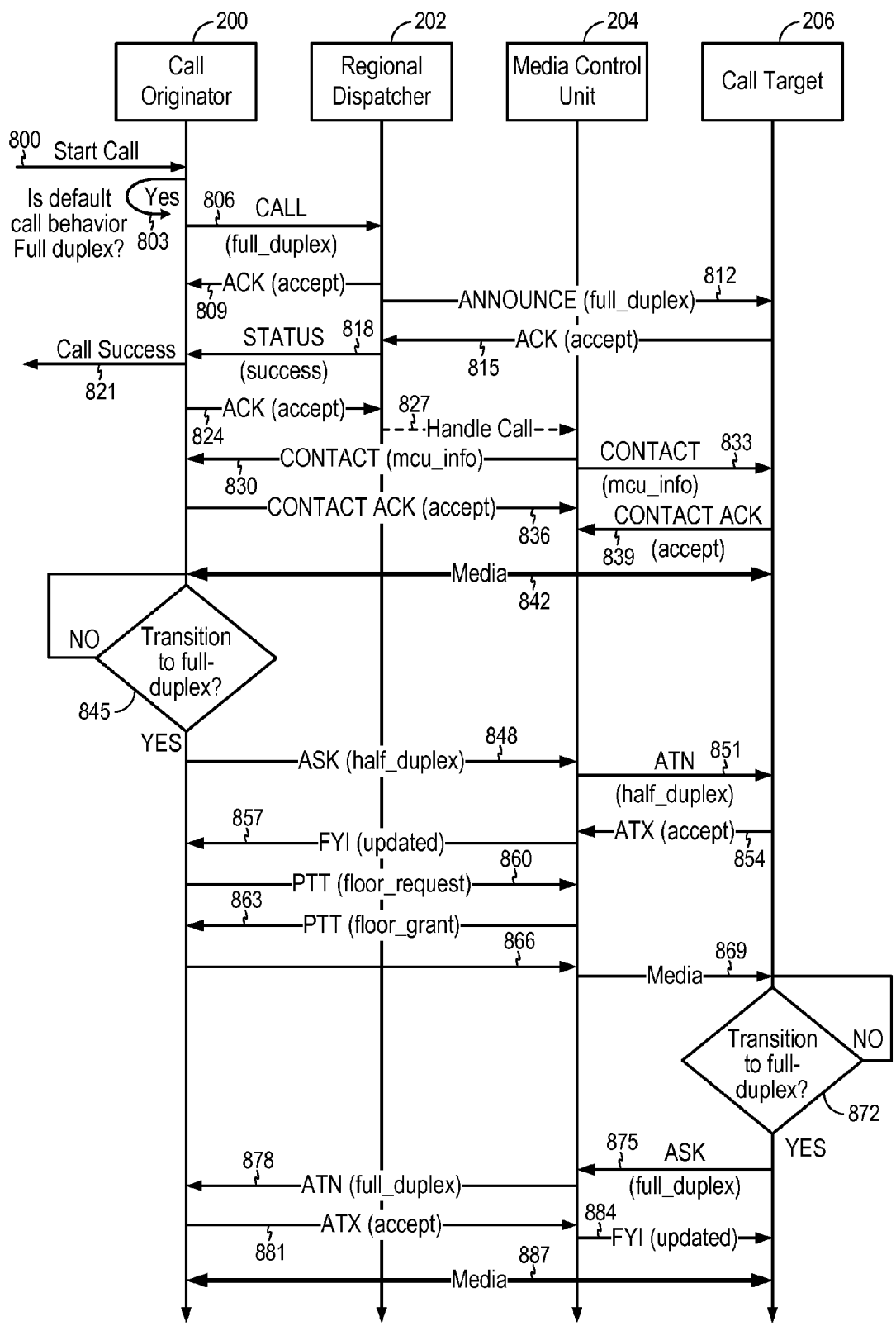
FIG. 8 is a call flow diagram of a communication session that transitions between a half-duplex communication and a full-duplex communication in accordance with an embodiment of the invention.

FIG. 8 is a call flow diagram of a communication session that transitions between a half-duplex communication and a full-duplex communication in accordance with an embodiment of the invention. Referring to FIG. 8, a user of a call originator 200 determines to initiate a communication session, 800, the call originator 200 determines that the call will initially be set-up as a full-duplex session (e.g., if the default behavior for calls from the originator 200 is full-duplex), 803, and the call originator then sends a CALL(full duplex) message to initiate a full duplex call to the regional dispatcher 202 (e.g., which can be the group communication server 74 or 134), 806. In an example, the CALL(full duplex) message of 806 is configured differently than a conventional CALL message for setting up a conventional full-duplex session (i.e., a full-duplex session that starts and ends as full-duplex and is never half-duplex). For example, the CALL(full duplex) message of 806 may include a different op-code setting in a header portion thereof to indicate, to the regional dispatcher 202, to establish the full-duplex session as a half-duplex session at least during an initial portion of the session. The regional dispatcher 202 acknowledges receipt of the call message from 806 with an ACK (accept) message, 809. In an example, the initiation of the full-duplex session can be performed at the call originator 200 (e.g., which may correspond to an originating wireless communication device 10) by pressing a non-PTT button, such as the "SEND" button which is common to mobile telephones, which will cause transmission of the specially configured CALL(full duplex) message. Upon receiving the full-duplex call request message in 806, the regional dispatcher 202 also locates the target(s) for the call and sends an ANNOUNCE(full duplex) message to notify the call target 206 that a full-duplex call has been requested by the call originator 200. Similar to the CALL(full duplex) message, the ANNOUNCE(full duplex) message can be specially configured to indicate to the call target 206 that the announced session will start as half-duplex with the goal of later transitioning to full-duplex.

In this embodiment, it is assumed that the call originator 200 and call target 206 are both provisioned with PTT/full-duplex clients for selectively switching their session between full-duplex and half-duplex. In particular, the example of FIG. 8 illustrates the duplex-switch occurring based on an ASK message, whereby the ASK message can be configured to request a transition to from half-duplex to full-duplex (e.g., "ASK(full duplex)"), or from full-duplex to half-duplex (e.g., "ASK(half duplex)").

While FIG. 8 is illustrated and described such that transitions between half-duplex and full-duplex are triggered by an explicit message (e.g., an ASK message) from one of the call participants, other embodiments need not rely on explicit requests for a duplex-transition for triggering the duplex-transition, and instead can be server-initiated. For example, the duplex transition trigger can be "contention based" such that, if a user tries to repeatedly and unsuccessfully grab the floor during a half-duplex portion of the session while the floor is held by another participant, a transition to full-duplex can be initiated without user intervention. In another alternative example, the duplex transition trigger can be based upon "resource utilization" such that, as full-duplex calls tend to be more resource-intensive (such as including the bandwidth necessary to transmit background noise), a transition from full-duplex to half-duplex can be made based on voice activity and other metrics (e.g., if only one participant in full-duplex is speaking for a period of time, the call may transition to half-duplex to conserve resources, etc.). In a server-initiated duplex-transition, the server can either make a recommendation to one or more session participants (e.g., the originator, etc.) that a transition to half-duplex is beneficial (e.g., a lower cost on a bill), or alternately, an automatic transition can be made by the server arbitrating the session (e.g., the media control unit 204 and/or regional dispatcher 204).

Returning to FIG. 8, upon receiving the ANNOUNCE (full-duplex) message that announces the communication session in 812, assume that the call target 206 accepts the call, 815. The regional dispatcher 202 receives the indication of the call target's 206 acceptance, and forwards a STATUS (success) message to the call originator 200 to indicate that the call can begin, 818. The call originator 200 indicates that the call has successfully been established to a user thereof, 821, (e.g., by playing a tone, displaying a visual message, etc.) and the call originator 200 accepts the call by sending an ACK (accept) message back to the regional dispatcher 202, 824.

Next, the regional dispatcher 202 sends instructions to a media control unit 204 (e.g., a server that works with the regional dispatcher 202 for handling the exchange of media for a particular communication session) to handle the actual exchange of media between the call originator 200 and call target 206 during the communication session, 827. The media control unit 204 sends a CONTACT (mcu_info) message to the call originator 200, 830, and the call target 206, 833, that includes information with regard to how each call participant can send information to the media control unit 204. The call originator 200 and call target 206 each send CONTACT ACK (accept) messages responsible to the CONTACT messages from 830 and 833 in 836 and 839, respectively. Next, the media control unit 204 arbitrates the exchange of media between the call participants during a full-duplex portion of the communication session, 842. In other words, the media exchanged between the call originator 200 and call target 206 can flow in either direction, or in both directions.

In the embodiment of FIG. 8, the media control unit 204 uses specially configured signaling messages (e.g., ATN(full duplex) and ATN(half duplex) messages) to notify the wireless communication devices when a communication session has been requested to be transitioned to full-duplex or half-duplex, and the PTT/full-duplex clients at the devices 200 and 206 use ATX(accept) messages to accept the duplex transitions. While not shown, in FIG. 8, it is also possible that one or more session participants can reject the duplex transition, which will result in either the server refraining from performing the duplex transition or dropping the session participants that rejected the duplex transition from the session after the duplex transition is made. The media control unit 204 can also use an FYI(updated) message to notify the PTT/full-duplex client that requested the duplex-transition that the call has been transitioned to the requested duplex-mode.

Accordingly, the call originator 200 determines whether to request that the communication session be transitioned from full-duplex to half-duplex with the call originator 200 to be the floor-holder after the duplex transition, 845. As noted above, a transition from full-duplex to half-duplex can be desired so as to conserve system resources (e.g., if only the call originator 200 has been doing most of the speaking), to reduce the cost of the session to the call originator 200, etc. While this determination is shown in 845 as being made by the call originator 200, it will be appreciated that the call target 206 may also have the option of requesting such a transition in at least one embodiment, although this aspect has been omitted from FIG. 8 for convenience of explanation. In other words, other embodiments can permit non-originators to request and potentially achieve duplex transitions.

If the call originator 200 determines not to request that the communication session be transitioned from full-duplex to half-duplex in 845, the process returns to 842 and the full-duplex session continues. Otherwise, if the call originator 200 determines to request that the communication session be transitioned from full-duplex to half-duplex in 845, the call originator 200 sends an ASK (half-duplex) message to the media control unit 204, 848, and the media control unit sends an ATN (half-duplex) message to the call target 206, 851. The ATN (half-duplex) message functions as a request for the call target 206 to consent to the transition from full-duplex to half-duplex, or at least to inform the call target 206 that the duplex transition is taking place. Accordingly, assume the target device 206 responds to the ATN (half-duplex) message by sending an ATX (accept) message, 854, and the media control unit 204 sends a FYI (updated) message to the call originator 200 to indicate that the communication session can now be transitioned to half-duplex, 857. The call originator 200 thereby sends a floor-request message to the media control unit 204, 860, and the media control unit 204 sends a floor-grant message back to the call originator 200, 863. The call originator 200 thereafter sends media over its allocated half-duplex channel to the media control unit 204, 866, which then forwards the media to the call target 206, 869.

During this half-duplex portion of the communication session, the call target 206 determines whether to transition the call back to full-duplex (e.g., so that a user of the call target 206 can speak), 872. If the call target 206 determines not to request that the communication session be transitioned from half-duplex to full-duplex in 872, the process returns to 869 and the half-duplex session continues. Otherwise, if the call target 206 determines to request that the communication session be transitioned from half-duplex to full-duplex in 872, the call target 206 sends an ASK (full-duplex) message to the media control unit 204, 875, and the media control unit sends an ATN (full-duplex) message to the call originator 200, 878. The ATN (full-duplex) message functions as a request for the call originator 200 to consent to the transition from half-duplex to full-duplex, or at least to inform the call originator 200 that the duplex transition is taking place. Accordingly, assume the call originator 200 responds to the ATN (full-duplex) message by sending an ATX (accept) message, 881, and the media control unit 204 sends a FYI (updated) message to the call originator 200 to indicate that the communication session can now be transitioned to full-duplex, 884. Thereafter, media can be exchanged between the call originator 200 and call target 206 via full-duplex protocols, 887.

In the embodiment of FIG. 8, the full-duplex and half-duplex requests are specially signaled to the users of the devices (e.g., after the ATN message is received in 851 and/or 878, such that the devices other than the device requesting the transition report a transition notification or prompt to the user thereof), such as through a series of audible alerts, e.g. three audible pulses, in the PTT communication which will indicate to the user that another session participant wishes to change the duplex-characteristic of the session (e.g., the originator of the PTT/full-duplex communication 200 desires to engage in a full-duplex communication with the PTT/full-duplex call target 206, etc.). For example, the audible alerts can be classic ringtones, voice, dial tones, or other alerts sent in the PTT communication to notify a user of the other session participants requested duplex-. The acceptance of the duplex transition can then be made with a non-PTT button press (such as the "SEND" button) or menu selection (e.g., so that the user can be sure to be made aware of the current duplex-nature of the session). Alternatively, the user of these devices can receive the duplex-transition alert but need not be given the opportunity to reject the duplex-transition, such that the duplex-transition is forced upon the users thereof. In either case, even if the session participants are forced into a duplex-transition, the session participants will generally always be kept aware with regard to whether their microphone and other communication interfaces are on and broadcasting to the other party (e.g., although in at least one embodiment, an administrative session participant, such as a parent, may be permitted to 'snoop' upon another session participant, such as a child, by forcing a full-duplex transition without the child being notified so its audio can be listened in on).

While FIG. 8 shows, in some instances, session participants requesting a transition from half-duplex to full-duplex in order to send information to other session participant(s), it will be appreciated that these session participants could alternatively simply request the floor of the half-duplex session, as is known in art. In this case, if floor-requests are repeated denied to these session participants, the session participants may then request a duplex-transition.

Figure 9:
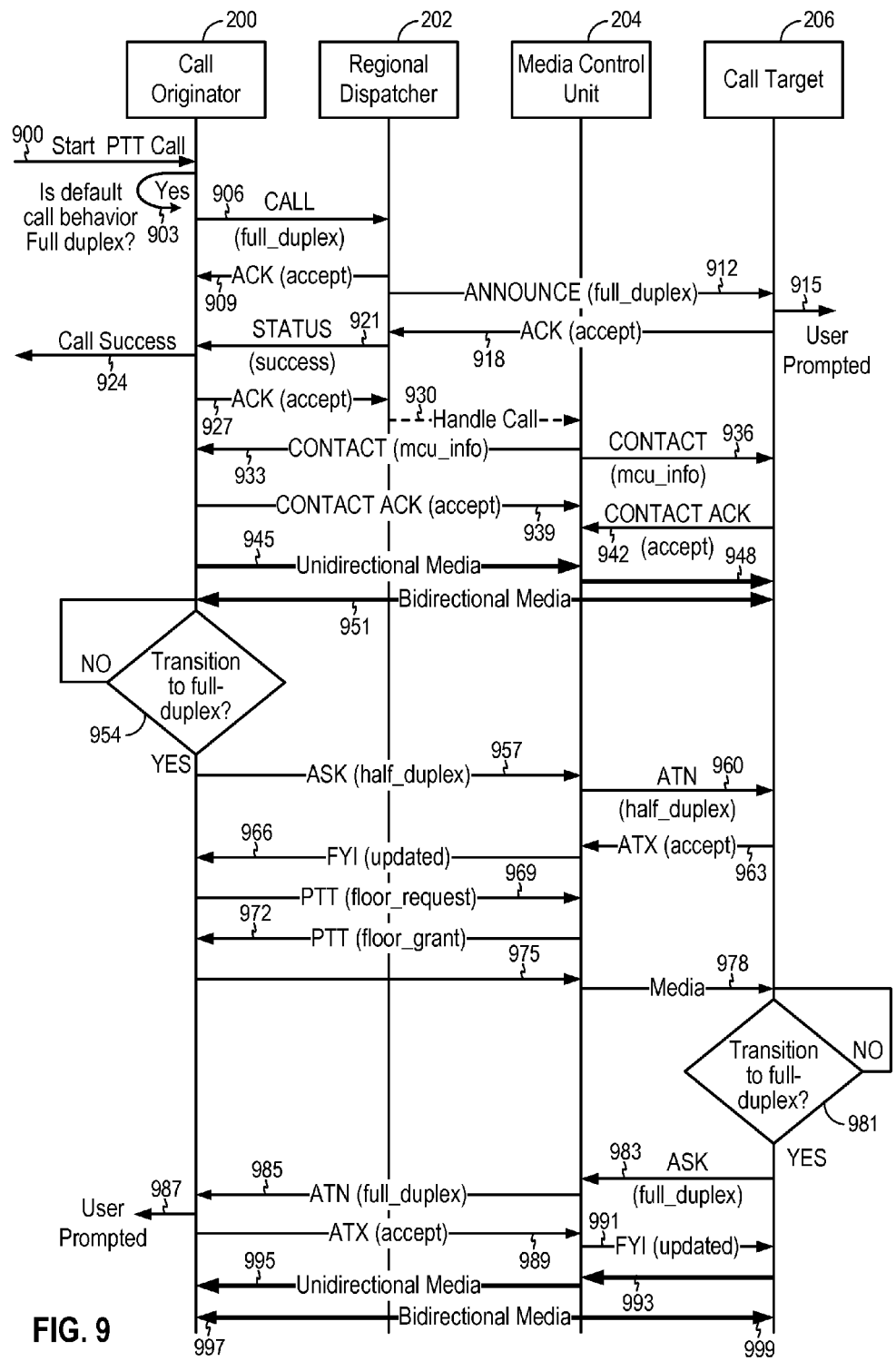
FIG. 9 is another call flow diagram of a communication session that transitions between a half-duplex communication and a full-duplex communication in accordance with an embodiment of the invention.

FIG. 9 is another call flow diagram of a communication session that transitions between a half-duplex communication and a full-duplex communication in accordance with an embodiment of the invention. FIG. 9 is similar in some respects to FIG. 8, although that the PTT/full-duplex call originator 200 also is capable of sending unidirectional media (e.g., such as voice, data, etc.) while transitioning between half-duplex and full duplex communications. A general discussion of FIG. 9 has been omitted for the sake of brevity, although aspects of FIG. 9 that differ from FIG. 8 will now be discussed in more detail.

Referring to FIG. 9, when the ANNOUNCE (full-duplex) message is sent to the call target 206 in 912 (e.g., as in 812 of FIG. 8), a user of the call target 206 is prompted to accept the full-duplex communication session, 915, to allow sourcing of its media while media from the call originator 200 (e.g., the full duplex transition initiator) can be played out at the same time in a half duplex fashion, 945 and 948. Thus, the half-duplex media is still played out, 945 and 948, while the transition is being effected by the media control under 204. Once the full-duplex session is established in 951, it will be appreciated that the uni-directional path from 945 and 948 can transition into the bi-directional or full-duplex path. Similarly, during a later transition to full-duplex (981 through 999) after an intervening transition to half-duplex (954 to 978), a half-duplex or uni-directional channel from the call target 206 to the call originator 200 can be established, 993 and 995. In this case, a half-duplex channel is established in each direction before the full-duplex channel is established. It will be appreciated that the establishment of a uni-directional or half-duplex channel in 945 and 948 from originator 200 to target 206 prior to establishing the initial full-duplex session in 951 is similar to FIGS. 5 through 7 in the sense that a temporary half-duplex session whereby the originator can speak to the target is set-up while waiting for the full-duplex session to begin.

Figure 10:
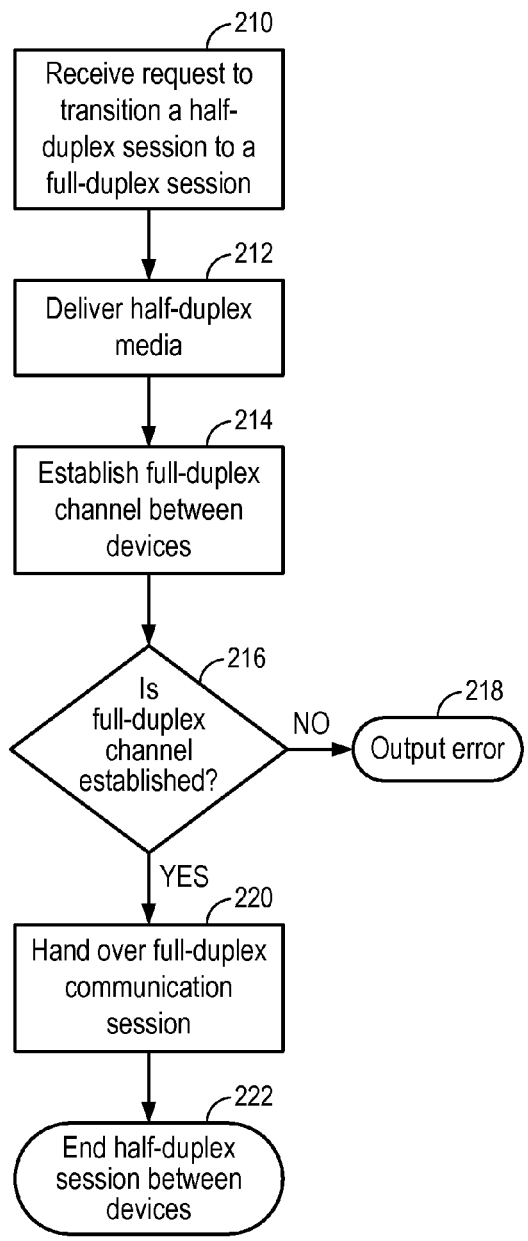
FIG. 10 is a flowchart of one embodiment of transitioning a current half-duplex session between an originating device and a target device to a full-duplex session in response to a duplex-transition request received from one of the session participants.
Figure 12:
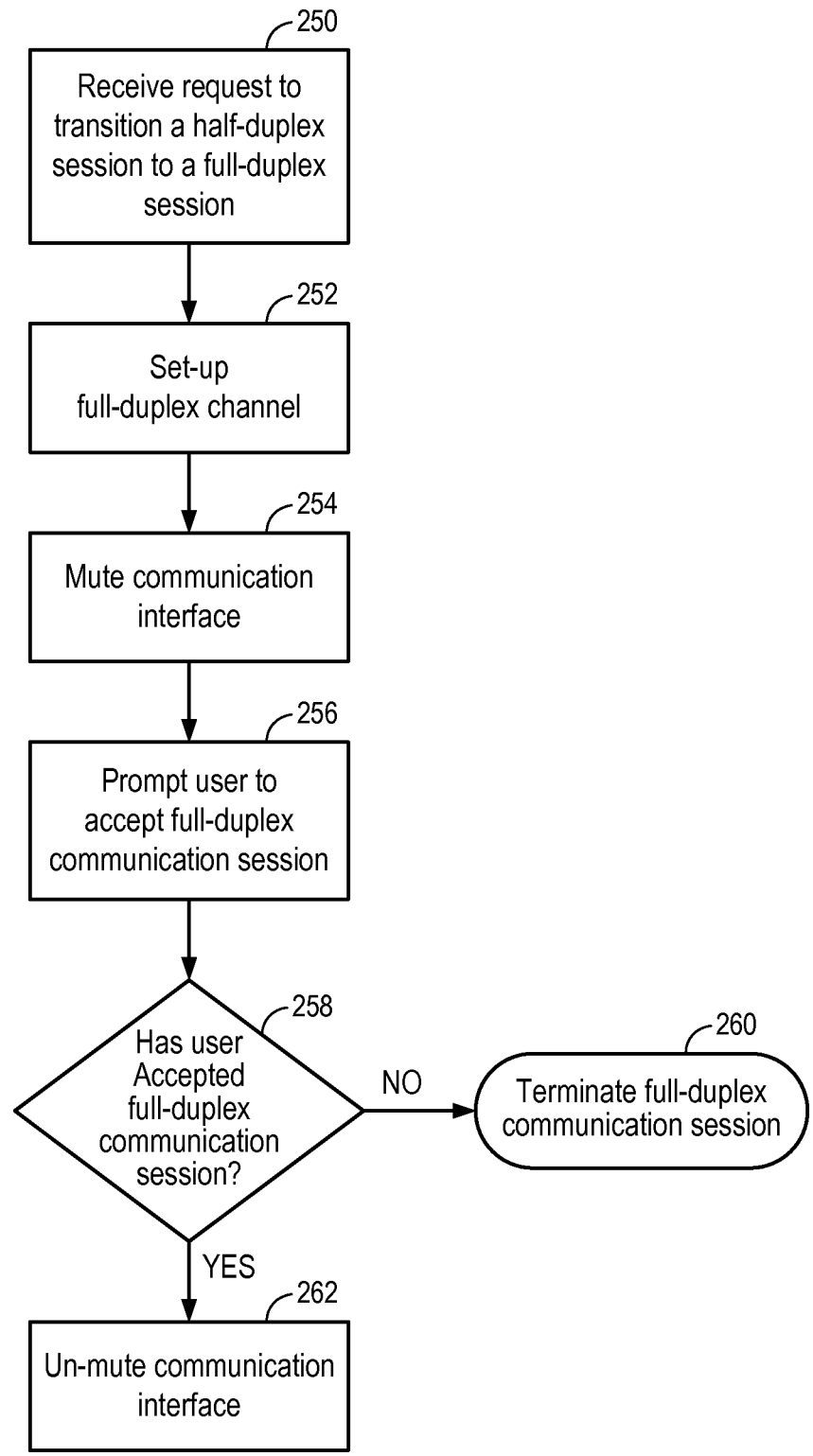
FIG. 12 is a flowchart of one embodiment of a process performed at a session participant engaged in a half-duplex communication session when another session participant of the half-duplex communication session requests that the session be transitioned from half-duplex to full-duplex in accordance with an embodiment of the invention.

FIG. 10 is a flowchart of one embodiment of transitioning a current half-duplex session between an originating device 10 and a target device 12 to a full-duplex session in response to a duplex-transition request received from one of the session participants. Accordingly, while arbitrating the half-duplex session between devices 10 and 12 (e.g., with originating device 12 as floor-holder), the group communication server 134 receives a request to establish a full-duplex connection between the originating communication device 10 and target communication device 12, 210, and then the half-duplex media (e.g., any media that has been buffered by the media control unit 204 at the GCS 134 from the session participant that initiated the transition to full-duplex) is delivered to the target communication device 12, 212. As will be appreciated, the delivery of 212 corresponds to the delivery of media to the target device 12 and/or any other devices that were participating in the half-duplex session along with devices 10 and 12. The full-duplex communication between the devices 10 and 12 is then established, 216. In this embodiment, the establishment of the full-duplex communication channel is automatic and the target device 12 will determine whether or not to ultimately engage in the full-duplex communication, as shown in FIG. 12.

Referring to FIG. 10, the group communication server 134 determines whether full-duplex channel for the full-duplex communication session is established, 216. If the group communication server 134 determines that the full-duplex channel for the full-duplex communication session is not established in 216, then an error is output indicating the failure to perform the full-duplex transition is sent to the session participant that requested the full-duplex transition (e.g., a message is sent to the session participant requesting the transition to full-duplex that indicates that the transition will not occur), and the full-duplex transition process terminates, 218. In an example, the transition to full-duplex may fail if the target device 12 ultimately rejects the full-duplex request and/or if there is a technical failure in establishing the full-duplex communication. However, the full-duplex transition failure does not necessarily terminate the initial half-duplex session.

Otherwise, if the group communication server 134 determines that the full-duplex channel for the full-duplex communication session is established in 216, then the communication session is handed over to an appropriate device (such as active call controller 78) and the communication session is thereafter supported as a full-duplex session at least between devices 10 and 12, 220, and the process of FIG. 10 terminates, 222. Alternatively, while not shown in FIG. 10, it is also possible that the group communication server 134 arbitrates the full-duplex session (e.g., a VoIP session), in which case there is no handoff of arbitration responsibilities in 220 and the group communication server 134 continues to arbitration the session as full-duplex.

Figure 11:
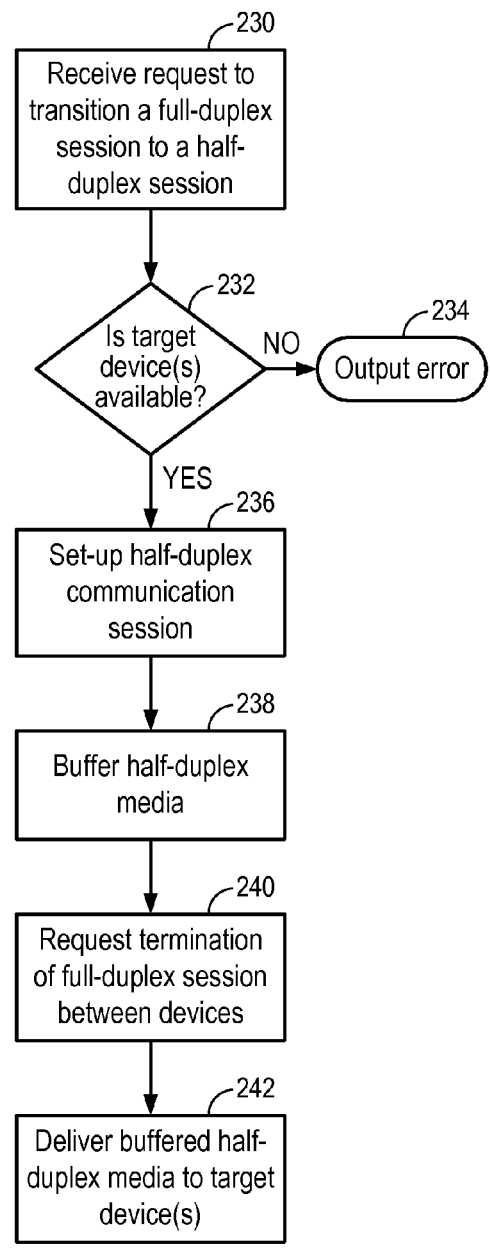
FIG. 11 is a flowchart of one embodiment of transitioning a current full-duplex session between an originating device and a target device to a half-duplex session to in response to a duplex-transition request from one of the session participants.

FIG. 11 is a flowchart of one embodiment of transitioning a current full-duplex session between an originating device 10 and a target device 12 to a half-duplex session to in response to a duplex-transition request from one of the session participants in accordance with an embodiment of the invention. Referring to FIG. 11, the group communication server 134 receives a request to transition a full-duplex communication session, by a session participant to the full-duplex communication session, to a half-duplex communication session with the requesting session participant as floor-holder, 230. The group communication server 134 determines whether the target device (or devices) is available for the half-duplex communication (e.g., in this case, the target device can correspond to either the call target 206 of the initial full-duplex session, or the call originator 200 of the initial full-duplex session, depending on which device requests the transition to half-duplex), 232. If no call target is available for the half-duplex session, then an error is output to the device that requested that half-duplex transition and the process terminates, 234, and the full-duplex session can continue. The determination of how many target devices need to be available in order for the half-duplex session to proceed can be one or more, and can include at least the other device (i.e., the device that did not request the transition to half-duplex in 230) that was previously engaged in the full-duplex communication session. As will be appreciated, while the non-requesting device is likely to be available for the transition to half-duplex, there can be reasons that the half-duplex session is not supportable by the non-requesting device (e.g., such as a technical failure, a prioritization scheme where another communication session has a higher priority at the non-requesting device, and/or other restrictions imposed on the requesting device that would preclude further PTT communications therefrom, e.g. a prepaid PTT functionality that is without funds, etc.).

Otherwise, if the target device is available at 232, the group communication server 134 sets-up the half-duplex communication session, 236. Half-duplex media (e.g., such as voice data) from the requesting device is received and buffered at the group communication server 134, 238, and then the initial full-duplex communication session is requested by the group communication server 74 to be terminated by the appropriate device controlling the full-duplex communication session (e.g., such as active call controller 78), 240. Alternatively, if the group communication server 134 itself was controlling the full-duplex communication session, it is appreciated that the request of 240 need not be sent and the full-duplex communication session can simply be dropped by the group communication server 134.

After terminating the full-duplex portion of the session in 240, the buffered half-duplex media from 238 is delivered to the target device(s), 242.

FIG. 12 is a flowchart of one embodiment of a process performed at a session participant engaged in a half-duplex communication session when another session participant of the half-duplex communication session requests that the session be transitioned from half-duplex to full-duplex in accordance with an embodiment of the invention. Referring to FIG. 12, the session participant (e.g., a target communication device such as wireless communication device 12, the session originator, etc., where the session participant receiving the request in 250 can correspond to either the current speaker in the half-duplex session or a non-floorholder in half-duplex session) receives a request for a full-duplex communication session during the half-duplex communication session, 250. In an example, the 'request' of 250 may function to force the session participant to accept the transition to full-duplex, even if the session participant corresponds to a current floor-holder of the half duplex session. In this case, the full-duplex channel is established in 252 before a user of the target device consents to participate in the full-duplex session. Alternatively, in another example, while not shown in FIG. 12, the user of the target device may be alerted of the full-duplex transition request (e.g., such as through special ringing, etc.,) and can be given the opportunity to accept or reject the request. In a further example, session participants having a low priority (e.g., lower than the participant that requested the duplex transition) can be forced to transition to full-duplex, whereas session participants having a high priority (e.g., higher than the participant that requested the duplex transition) can be given the option with regard to accept or reject the session. Assuming that the session participant is either forced to perform a duplex transition or a user thereof voluntarily elects to perform the duplex transition, the full-duplex channel is set-up, 252. In an example, if the target device did not have a traffic channel (TCH) during the half-duplex session, setting up the full-duplex channel in 252 may include the target device acquiring the TCH from an access network. The target device (e.g., wireless communication device 12) then mutes its communication interface, 254, such as a microphone 115 and/or camera 113, so that the user of the device will not yet send data over the full-duplex channel (e.g., for the user's privacy), 254, and then prompts the user to accept the full-duplex communication, 256, which can be a simple audio alert, visual alert etc. The muting step 254 can be optional if the microphone 115 is already muted or the communication interface is otherwise inactive when the full-duplex communication is bridged to the device.

Referring to FIG. 12, the target device determines whether its user has accepted the full-duplex communication session, 258. If the target device determines that the user has not accepted the full-duplex communication session, the full-duplex communication session is terminated and the full-duplex channel set-up in 252 is dropped, 260. Otherwise, if the target device determines that its user has accepted the full-duplex communication session in 258, then the communication interface is un-muted and the user can engaged in the established full-duplex communication session, 260. In an example, the target device can reject the full-duplex request by simple inaction in acceptance, e.g. if the user has not accepted in 5 seconds, or can press a button, such as the PTT button 112, to expressly maintain the half-duplex communication session. Accordingly, in the process of FIG. 12, the half-duplex session need not be dropped at least until the user of the target device has an opportunity to decide whether or not to accept the full-duplex session.

In another embodiment the target communication device 12 is embodied with selective control of forcing the full-duplex communication, the method can include the target communication device 12 selectively allowing the forcing of the establishment of the full-duplex communication, and thereby selectively allowing the activation of the microphone 115 (e.g., in contrast to FIG. 12 which shows the microphone 115 remaining 'muted' until the target user optionally accepts the full-duplex session after the full-duplex session is established. In such embodiment, the user of the originating wireless communication device 10 will be able to hear audio collected at the microphone 115 at the target communication device 12. It will be appreciated that the target user's privacy can suffer in this instance, but this can be desirable under certain conditions. For example, a parent having the originating mobile telephone can force the microphone of a child's mobile telephone open for a full-duplex communication and the parent can talk and hear audio at the child's telephone.

Further, while above-described embodiments of the invention include references to signaling messages that are specific to particular implementations and/or protocols (e.g., ASK, ATN, CALL, ANNOUNCE, etc.) it will be appreciated that these signals can be modified as appropriate in embodiments directed to other implementations and/or protocols. In other words, the CALL message may correspond to any type of call request message in other embodiments of the invention, the ANNOUNCE message may correspond to any type of messages that announces a communication session in other embodiments of the invention, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of establishing a full-duplex communication session within a wireless communications system, comprising:
    receiving, from an originating device, a request to initiate the full-duplex communication session between the originating device and at least one target device;
    establishing a half-duplex communication session between the originating device and the at least one target device in response to the received request;
    receiving, from the originating device, device-captured media associated with the full-duplex communication session for delivery to the at least one target device before the full-duplex communication session is established with the at least one target device; and
    transmitting the device-captured media to the at least one target device via the half-duplex communication session instead of waiting for the full-duplex communication session to be established.

2. The method of claim 1, wherein the establishing includes:
    setting up a half-duplex communication channel from the originating device to the at least one target device in response to the received request,
    wherein the transmitting transmits the device-captured media to the at least one target device over the half-duplex communication channel.

3. The method of claim 2, wherein setting up the half-duplex communication channel includes announcing the full-duplex communication session, along with an indication that the full-duplex communication session is initially going to be set-up as the half-duplex communication session, to the at least one target device and receiving a call acceptance message from the at least one target device.

4. The method of claim 3, wherein the call acceptance message accepts the half-duplex communication session.

5. The method of claim 4, further comprising:
    receiving another call acceptance message from the at least one target device,
    wherein the another call acceptance message accepts the full-duplex communication session.

6. The method of claim 4, further comprising:
    receiving media from the at least one target device,
    wherein the received media indicates an implicit acceptance of the full-duplex communication session.

7. The method of claim 1, further comprising:
    setting up a full-duplex communication channel for the full-duplex communication session between the originating device and the at least one target device; and
    terminating the half-duplex communication session upon establishment of the full-duplex communication channel.

8. The method of claim 1, further comprising:
    receiving an indication from the at least one call target that the full-duplex session is not accepted.

9. The method of claim 8, wherein the received indication corresponds to a call reject message or the absence of a call accept message.

10. The method of claim 1, further comprising:
    sending a single announce message that is specially configured to indicate, to the at least one target device, that the full-duplex communication session is being initiated and that the full-duplex communication session will temporarily be supported by the half-duplex communication session.

11. The method of claim 10, wherein the single announce message is configured to force the at least one target device to accept the temporary half-duplex communication session and the full-duplex communication session.

12. The method of claim 1, further comprising:
    sending a first announce message to the at least one target device to announce the half-duplex communication session; and
    sending a second announce message to the at least one target device, after the first announce message is sent, to announce the full-duplex communication session.

13. The method of claim 12, wherein the first announce message is configured to force the at least one target device to accept the half-duplex communication session and the second announce message is configured to force the at least one target device to accept the full-duplex communication session.

14. A method of establishing a full-duplex communication session within a wireless communications system, comprising:
    configuring, at an originating device, a request to initiate the full-duplex communication session between the originating device and at least one target device by establishing a half duplex communication session between the originating device and the at least one target device before the full-duplex communication session is established;
    sending the configured request from the originating device; and
    transmitting device-captured media associated with the full-duplex communication session to the at least one target device before the full-duplex communication session is established with the at least one target device, wherein the device-captured media is transmitted to the at least one target device via the half-duplex communication session instead of waiting for the full-duplex communication session to be established.

15. The method of claim 14, further comprising:
    setting up a half-duplex communication channel to the at least one target device,
    wherein the transmitting transmits the device-captured media to the at least one target device over the half-duplex communication channel before the full-duplex communication session is established.

16. The method of claim 15, further comprising:
    setting up a full-duplex communication channel for the full-duplex communication session between the originating device and the at least one target device;
    terminating the half-duplex communication session after the full-duplex communication session is established; and exchanging media with the at least one target device over a full-duplex communication channel after the full-duplex communication session is established.

17. A server configured to arbitrate communication sessions between access terminals within a wireless communications system, comprising:
    means for receiving, from an originating device, a request to initiate a full-duplex communication session between the originating device and at least one target device;
    means for establishing a half-duplex communication session between the originating device and the at least one target device in response to the received request;
    means for receiving, from the originating device, device-captured media associated with the full-duplex communication session for delivery to the at least one target device before the full-duplex communication session is established with the at least one target device; and
    means for transmitting the device-captured media to the at least one target device via the half-duplex communication session instead of waiting for the full-duplex communication session to be established.

18. An access terminal configured to participate in server-arbitrated communication sessions within a wireless communications system, comprising:
    means for configuring a request to initiate a full-duplex communication session between the access terminal and at least one target device by establishing a half duplex communication session between the access terminal and the at least one target device before the full-duplex communication session is established;
    means for sending the configured request from the access terminal; and
    means for transmitting device-captured media associated with the full-duplex communication session to the at least one target device before the full-duplex communication session is established with the at least one target device, wherein the device-captured media is transmitted to the at least one target device via the half-duplex communication session instead of waiting for the full-duplex communication session to be established.

19. A server configured to arbitrate communication sessions between access terminals within a wireless communications system, comprising:
    logic configured to receive, from an originating device, a request to initiate a full-duplex communication session between the originating device and at least one target device; and
    logic configured to establish a half-duplex communication session between the originating device and the at least one target device in response to the received request;
    logic configured to receive, from the originating device, device-captured media associated with the full-duplex communication session for delivery to the at least one target device before the full-duplex communication session is established with the at least one target device; and
    logic configured to transmit the device-captured media to the at least one target device via the half-duplex communication session instead of waiting for the full-duplex communication session to be established.

20. An access terminal configured to participate in server-arbitrated communication sessions within a wireless communications system, comprising:
    logic configured to configure a request to initiate a full-duplex communication session between the access terminal and at least one target device by establishing a half duplex communication session between the access terminal and the at least one target device before the full-duplex communication session is established;
    logic configured to send the configured request from the access terminal; and
    logic configured to transmit device-captured media associated with the full-duplex communication session to the at least one target device before the full-duplex communication session is established with the at least one target device, wherein the device-captured media is transmitted to the at least one target device via the half-duplex communication session instead of waiting for the full-duplex communication session to be established.

21. A non-transitory computer-readable medium comprising instructions, which, when executed by a server configured to arbitrate communication sessions between access terminals within a wireless communications system, cause the server to perform operations, the instructions comprising:
    program code to receive, from an originating device, a request to initiate a full-duplex communication session between the originating device and at least one target device; and
    program code to establish a half-duplex communication session between the originating device and the at least one target device in response to the received request;
    program code to receive, from the originating device, device-captured media associated with the full-duplex communication session for delivery to the at least one target device before the full-duplex communication session is established with the at least one target device; and
    program code to transmit the device-captured media to the at least one target device via the half-duplex communication session instead of waiting for the full-duplex communication session to be established.

22. A non-transitory computer-readable medium comprising instructions, which, when executed by an access terminal configured to participate in server-arbitrated communication sessions within a wireless communications system, cause the access terminal to perform operations, the instructions comprising:
    program code to configure a request to initiate a full-duplex communication session between the access terminal and at least one target device by establishing a half duplex communication session between the access terminal and the at least one target device before the full-duplex communication session is established;
    program code to send the configured request from the access terminal; and
    program code to transmit device-captured media associated with the full-duplex communication session to the at least one target device before the full-duplex communication session is established with the at least one target device, wherein the device-captured media is transmitted to the at least one target device via the half-duplex communication session instead of waiting for the full-duplex communication session to be established.

23. The method of claim 1, wherein the at least one target device indicates its acceptance to the half-duplex communication session before indicating whether the at least one target device or a user of the at least one target device agrees to join the full-duplex communication session.

24. The method of claim 1,
    wherein the full-duplex communication session requested by the originating device corresponds to a two-way communication session that permits additional device-captured media to be conveyed from the originating device to the at least one target device concurrently with device-captured media being conveyed from the at least one target device to the originating device, and wherein the half-duplex communication session corresponds to a one-way communication session that permits the device-captured media received from the originating device to be conveyed from the originating device to the at least one target device without the at least one target device being permitted to convey device-captured media from the at least one target device to the originating device.

25. The method of claim 14, wherein the full-duplex communication session requested by the originating device corresponds to a two-way communication session that permits additional device-captured media to be conveyed from the originating device to the at least one target device concurrently with device-captured media being conveyed from the at least one target device to the originating device, and wherein the half-duplex communication session corresponds to a one-way communication session that permits the device-captured media transmitted by the originating device to be conveyed from the originating device to the at least one target device without the at least one target device being permitted to convey device-captured media from the at least one target device to the originating device.

26. The method of claim 1, further comprising:

sending a single announce message to the at least one target device for announcing both the half-duplex and full-duplex communication sessions.

27. The method of claim 1, further comprising:

sending at least one call announcement to the at least one target device to announce the full-duplex communication session; and after the device-captured media is transmitted to the at least one target device via the half-duplex communication session, establishing the full-duplex communication session in response to the at least one target device answering the at least one call announcement.

\* \* \* \* \*